Patented May 30, 1939

2,160,200

UNITED STATES PATENT OFFICE 2,160,200

ANTIOXIDANT FOR RUBBER COMPOSITION

Raymond F. Dunbrook and Bingham J. Humphrey, Akron, Ohio, assignors to The Firestone Tire & Rubber Company, Akron, Ohio, a corporation of Ohio No Drawing. Application December 21, 1936,
Serial No. 117,006

8 Claims. (Cl. 18—50)

This invention relates especially to impoved age-resisting rubber compositions and to methods of making the same.

The invention is of primary utility in the manufacture of carbon black rubber stocks, such as tire tread stocks, that are subject to light, heat, oxidation, abrasion, flexing, and other destructive agencies during use.

The chief objects of the invention are to provide an improved material suitable for incorporating in oxidizable organic compositions to retard deterioration thereof; to improve the resistance of rubber to abrasion; and to check or retard the formation of cracks in carbon black rubber stocks. Other objects will be manifest as the specification proceeds.

This invention consists in the incorporation in rubber or like organic materials, of an anti-oxidant or age-retarding compound of the general class of dihydroquinolines represented by the general formula

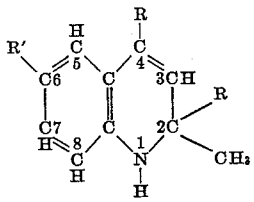

wherein the R in the 2 and 4 positions is an alkyl group such as methyl, ethyl, propyl, isopropyl, butyl, etc., and the R' in the 6 position is an aryl group such as a phenyl, tolyl, xylyl, etc.

An illustrative example of said general class is the compound 2,2,4-trimethyl-6 phenyl-1,2-dihydroquinoline of the following formula:

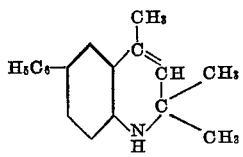

The compound is in the form of white crystals having a melting point of 102°–102.5° C.

The foregoing example of the compound was tested by compounding it in a rubber mix and comparing the resultant product with a control consisting of the same ingredients with the exception of the improved antioxidant, which was omitted. The composition of the mixes was as follows:

|  | A Control | B With improved antioxidant |
|---|---|---|
|  | Parts | Parts |
| Smoked sheet | 100 | 100 |
| Sulphur | 3 | 3 |
| Zinc oxide | 5 | 5 |
| Carbon black | 45 | 45 |
| Pine tar | 3 | 3 |
| Stearic acid | 3 | 3 |
| Mercapto-benzo-thiazole | 1.25 | 1.25 |
| Antioxidant | 0 | 1 |

The respective stocks A and B were thoroughly mixed and then vulcanized in a press for 100, 120, 140 and 160 minutes at 264° F. Test strips were cut from the vulcanized stocks and artificially aged, both stocks being aged 14 days in the Geer oven at 70° C. and some being aged 46 hours in the Bierer-Davis oxygen bomb at 70° C. The results of these tests follow:

Normal data

| Formula | Modulus at 400% | | | | Tensile at break | | | |
|---|---|---|---|---|---|---|---|---|
|  | 100 | 120 | 140 | 160 | 100 | 120 | 140 | 160 |
| A | 2725 | 2900 | 3050 | 3100 | 4550 | 4550 | 4575 | 4400 |
| B | 2700 | 2850 | 2975 | 3050 | 4600 | 4600 | 4575 | 4525 |

Aged 14 days in Geer oven at 70° C.

| Formula | Modulus at 400% | | | | Tensile at break | | | |
|---|---|---|---|---|---|---|---|---|
|  | 100 | 120 | 140 | 160 | 100 | 120 | 140 | 160 |
| A | 3025 | 3075 | 3350 | 3325 | 3625 | 3600 | 3650 | 3570 |
| B | 3275 | 3450 | 3525 | 3675 | 4000 | 4175 | 4025 | 4100 |

*Aged 46 hours in oxygen bomb*

| Formula | Modulus at 400% | | | | Tensile at break | | | |
|---|---|---|---|---|---|---|---|---|
| | 100 | 120 | 140 | 160 | 100 | 120 | 140 | 160 |
| A | 2200 | 2275 | 2425 | 2375 | 3000 | 3050 | 2900 | 3000 |
| B | 2475 | 2625 | 2725 | 2675 | 3475 | 3525 | 3375 | 3300 |

The foregoing data clearly show that rubber composition comprising the improved antioxidant compares favorably with untreated rubber stock in normal condition, and after artificial aging shows superior modulus and tensile characteristics.

Although but a single embodiment of the invention has been disclosed, it is not intended that the invention be limited solely thereto, since the exact proportions of the constituent materials may be varied, and other materials having equivalent chemical properties may be employed, if desired, without departing from the spirit of the invention or the scope of the appended claims.

What is claimed is:

1. The method of retarding the deterioration of rubber which comprises treating the rubber with 2,2,4-trimethyl-6 phenyl-1-,2-dihydroquinoline.

2. The method of retarding the deterioration of rubber which comprises vulcanizing rubber in the presence of 2,2,4-trimethyl-6 phenyl-1,2-dihydroquinoline.

3. A vulcanized rubber product resulting from the method set forth in claim 2.

4. A rubber composition comprising rubber and 2,2,4-trimethyl-6 phenyl-1,2-dihydroquinoline.

5. The method of retarding the deterioration of rubber which comprises treating the rubber with a 1,2-dihydroquinoline of the general formula

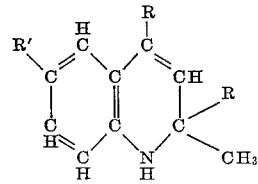

wherein R is a member of the group consisting of methyl, ethyl, propyl, isopropyl, and butyl radicals, and R' is a member of the group consisting of phenyl, tolyl, and xylyl radicals.

6. The method of retarding the deterioration of rubber which comprises vulcanizing rubber in the presence of a 1,2-dihydroquinoline of the general formula

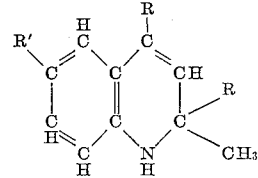

wherein R is a member of the group consisting of methyl, ethyl, propyl, isopropyl, and butyl radicals, and R' is a member of the group consisting of phenyl, tolyl, and xylyl radicals.

7. A rubber product made by the process of claim 5.

8. A vulcanized rubber product made by the process of claim 6.

RAYMOND F. DUNBROOK.
BINGHAM J. HUMPHREY.